Oct. 24, 1950 G. C. SZIKLAI 2,527,463

MULTICOLORED RECORD AND REPRODUCING SYSTEM THEREFOR

Filed March 29, 1946

INVENTOR.
GEORGE C. SZIKLAI
BY C. D. Tuska
Attorney

Patented Oct. 24, 1950

2,527,463

UNITED STATES PATENT OFFICE 2,527,463

MULTICOLORED RECORD AND REPRODUCING SYSTEM THEREFOR

George C. Sziklai, Princeton, N. J., assignor to Radio Corporation of America, a corporation of Delaware Application March 29, 1946, Serial No. 657,970

4 Claims. (Cl. 179—100.3)

Figure 1:
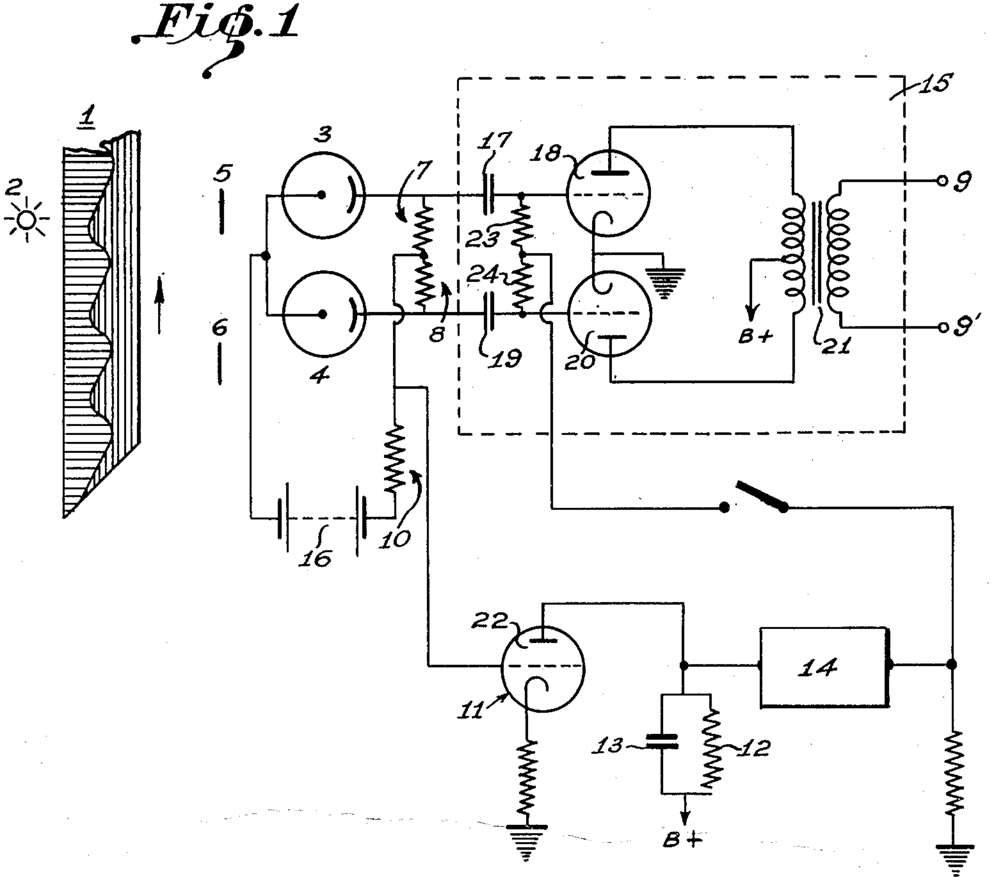

This invention relates to the reproduction of sound from sound records on which the sound to be reproduced is recorded in colors which are distinctly different so that the recorded sound may be reproduced by sound reproducers of the color separation type such as that depicted by Fig. 4 of Patent 2,238,733.

Among the various types of multicolored sound records which may be reproduced by the sound reproducer of the present invention are (1) that shown in Fig. 3 of Patent 2,238,733, (2) that shown in Fig. 5 of Patent 2,271,980, (3) that shown in Fig. 3 of Patent 2,102,695, and (4) those herein disclosed. As is well known, such records have the advantage that the sound reproduced from them is substantially free from background noise otherwise produced by imperfections in the photographic film on which the sound is recorded.

The multicolored sound records and sound reproducer of the present invention are distinguished from those of the aforesaid patents by the fact that they involve an additional record which is superimposed on the sound record as a variation in the density of the record. Such a variable density record has substantially no effect on the reproduced sound and may be used for a variety of purposes. For example, it may be (1) a sound record which is reproduced synchronously with the sound of the multicolored record, (2) a separate language recording for foreign release or the like, (3) a record for controlling the volume of the sound reproduced from the multicolored record, or (4) a record for controlling the relative outputs of loudspeakers located at different points in a theater.

Important objects of the invention are the provision of an improved record of the multitrack type and the provision of an improved apparatus and method of operation whereby different recorded tracks may be reproduced from a single record to produce a plurality of effects which are synchronized with one another.

The invention will be better understood from the following description considered in connection with the accompanying drawings and its scope is indicated by the appended claims.

Figure 2:
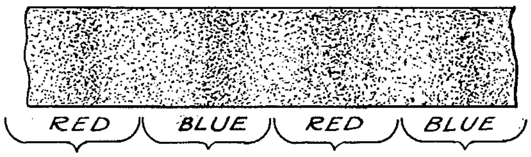

Referring to the drawings:

Fig. 1 is a wiring diagram of the improved reproducer and also illustrates a sectionalized multitrack record on which a sound wave shaped line constitutes the boundary between areas which are differently colored as indicated by the different cross hatching and on which the density of the entire record may be varied longitudinally of the record to provide an additional record as previously indicated, and Fig. 2 depicts a different type of sectionalized multicolored multitrack record which may be a subtractive color film on which the colors are varied without a dividing line by means of a prism or other means adapted to provide a continuous transition.

In the operation of the reproducer of Fig. 1, a multicolored multitrack record is moved longitudinally as indicated by the arrow to modulate the light transmitted from a light source 2 respectively through a blue filter 5 to a light sensitive device 3 and through a red filter 6 to a light sensitive device 4. Potential for operating the devices 3 and 4 is applied through a common resistor 10 and individual resistors 7 and 8. The potential developed by the device 3 is applied through a coupling capacitor 17 to one control grid of a push-pull amplifier 15 and that developed by the device 4 is likewise applied through a coupling capacitor 19 to the other grid 20 of the push-pull amplifier 15. Output potential modulated in accordance with the multicolored track of the record 1 is applied through a transformer 21 to a pair of output terminals 9—9' which may be connected to a loud speaker for reproducing the intelligence depicted in the multicolored track.

Potential modulated by the variable density track, which is superimposed on the multicolored track, is derived from the common resistor 10 and is applied to the control grid 22 of an amplifier 11. If the output of the amplifier 11 is to be used for controlling the volume of the push-pull amplifier 15, it may be passed through a low pass filter 12—13, amplified by an amplifier 14 and applied through resistors 23 and 24 to the grids 18 and 20. If the output of the amplifier 11 is of audio frequency, it may be amplified and utilized to operate a loud speaker. The filter 12—13, of course, is to be omitted in cases where all the frequency components are desired in the amplifier output. Depending on the character of the superimposed variable density track, the output of the amplifier 11 may be made to serve a variety of purposes as will be apparent to those skilled in the art.

The intensity signal which develops across the common resistor 10 may be applied to the amplifier with such polarity that it will compensate for all intensity changes, thus further improving the noise immunity. This may be best understood when one considers that at instantaneous level when a common noise source is not producing equal disturbances in both color channels, the noise signal produces a noise cross-talk product which can be completely bucked out by the signal derived from $R_{10}$. It is further possible to degenerate this noise by applying the signal developed across resistor 10 to the light source, thus providing a degenerating loop.

From the foregoing description, it is seen that the distinguishing characteristics of the present invention are a record bearing superimposed multicolored and variable density tracks and means for reproducing in separate circuits what is depicted on these superimposed tracks.

I claim as my invention:

1. A sound film record bearing longitudinally disposed, superimposed tracks, one of which is a sectionalized, multicolored track reproducible to obtain a recorded sound signal, and the other of which is a variable density track extending over the entire transverse width of said record and detectable to vary a characteristic of said record.

2. A sound film record bearing longitudinally disposed, superimposed tracks, one of which is a multicolored variable width sound track having opposed areas differently colored and reproducible to obtain a recorded sound signal, and the other of which is a variable density track extending over the entire transverse width of said record and detectable to vary a characteristic of said signal sound track.

3. In a device for reproducing the intelligence depicted on a record in the form of a multicolored track and a variable density track superimposed on said multicolored track, the combination of a pair of light sensitive devices connected in push-pull, colored light filters between said devices and said record, light variations in accordance with one colored portion of said multicolored track being impressed on one of said light sensitive devices and light of opposite amplitude variations in accordance with another colored portion of said multicolored track being impressed on the other of said light sensitive devices, a push-pull amplifier responsive to the separate currents of said devices for reproducing the intelligence depicted on said multicolored track, and means responsive to the total current of said devices as said multicolored track portions vary in density for reproducing the intelligence recorded on said variable density track.

4. In a device for reproducing the intelligence depicted on a record in the form of a multicolored track having two variable area portions extending longitudinally of said record and a variable density track superimposed on said multicolored track, said density track being uniform variations in density of said variable area portions, a pair of light sensitive elements each having a separate output lead and both having an output lead in common, means responsive to the current in said common lead produced by the variations in density of said variable area portions for reproducing the intelligence depicted on said variable density track, colored light filters between said light sensitive elements and said record, light variations in accordance with one variable area portion of said multicolored track being impressed on one of said light sensitive elements and light of opposite amplitude variations in accordance with the other variable area portion of said multicolored track being impressed on the other of said light sensitive elements, a push-pull amplifier, and means coupling said push-pull amplifier to said separate leads for reproducing the intelligence depicted on said multicolored track.

GEORGE C. SZIKLAI.

REFERENCES CITED

The following references are of record in the file of this patent:

UNITED STATES PATENTS

| Number | Name | Date |
|---|---|---|
| 1,855,196 | Offenhauser, Jr. | Apr. 26, 1932 |
| 1,880,240 | Czeija et al. | Oct. 4, 1932 |
| 1,993,929 | Hammond, Jr. | Mar. 12, 1935 |
| 2,018,315 | Offenhauser, Jr. | Oct. 22, 1935 |
| 2,038,999 | Hammond | Apr. 28, 1936 |
| 2,102,695 | Gieskieng | Dec. 21, 1937 |
| 2,171,969 | Balsley | Sept. 5, 1939 |
| 2,199,606 | Baker | May 7, 1940 |
| 2,238,733 | Hullegard | Apr. 15, 1941 |
| 2,271,980 | Kellogg | Feb. 3, 1942 |
| 2,311,159 | Dimmick | Feb. 16, 1943 |
| 2,356,664 | Gorisch | Aug. 22, 1944 |

FOREIGN PATENTS

| Number | Country | Date |
|---|---|---|
| 460,872 | Great Britain | Feb. 5, 1937 |